United States Patent
Lombardo et al.

(10) Patent No.: US 11,805,223 B2
(45) Date of Patent: Oct. 31, 2023

(54) METHOD OF COLLECTING SIGNALS SENSED FROM SENSING TRANSISTORS, CORRESPONDING SENSOR DEVICE AND IMAGING CAMERA

(71) Applicant: STMicroelectronics S.r.l., Agrate Brianza (IT)

(72) Inventors: Pierpaolo Lombardo, Calascibetta (IT); Michele Vaiana, San Giovanni La Punta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/745,465

(22) Filed: May 16, 2022

(65) Prior Publication Data

US 2022/0377260 A1 Nov. 24, 2022

(30) Foreign Application Priority Data

May 20, 2021 (IT) .......................... 102021000013181

(51) Int. Cl.
*G01J 5/06* (2022.01)
*G01J 5/08* (2022.01)
*G01J 5/20* (2006.01)
*H04N 5/33* (2023.01)

(52) U.S. Cl.
CPC ................ *H04N 5/33* (2013.01); *G01J 5/064* (2022.01); *G01J 5/08* (2013.01); *G01J 5/20* (2013.01)

(58) Field of Classification Search
CPC .... H04N 5/33; G01J 5/064; G01J 5/08; G01J 5/20; G01J 2005/0077; G01J 5/24
See application file for complete search history.

(56) References Cited

U.S. PATENT DOCUMENTS

| 6,791,610 B1 | 9/2004 | Butler et al. |
| 7,489,024 B2 * | 2/2009 | Socher ............... G02B 26/0841 257/706 |
| 9,419,565 B2 * | 8/2016 | Nobbe .................. H04B 17/12 |

(Continued)

OTHER PUBLICATIONS

Saraf et al., CMOS-SOI-MEMS Uncooled Infrared Security Sensor With Integrated Readout, Apr. 5, 2016, Journal of the Electron Devices Society, vol. 4, pp. 155-162 (Year: 2016).*

(Continued)

*Primary Examiner* — Christine S. Kim
(74) *Attorney, Agent, or Firm* — CROWE & DUNLEVY

(57) ABSTRACT

Current signals indicative of sensed physical quantities are collected from sensing transistors in an array of sensing transistors. The sensing transistors have respective control nodes and current channel paths therethrough between respective first nodes and a second node common to the sensing transistors. A bias voltage level is applied to the respective first nodes of the sensing transistors in the array and one sensing transistor in the array of sensing transistors is selected. The selected sensing transistor is decoupled from the bias voltage level, while the remaining sensing transistors in the array of sensing transistors maintain coupling to the bias voltage level. The respective first node of the selected sensing transistor in the array of sensing transistors is coupled to an output node, and an output current signal is collected from the output node.

16 Claims, 4 Drawing Sheets

(56) References Cited

U.S. PATENT DOCUMENTS

2018/0035065 A1    2/2018    Nishino et al.

OTHER PUBLICATIONS

IT Search Report and Written Opinion for priority application, IT 102021000013181, report dated Feb. 8, 2022, 8 pgs.
Saraf Tomer et al: "CMOS-SOI-MEMS Uncooled Infrared Security Sensor With Integrated Readout", IEEE Journal of the Electron Devices Society, vol. 4, No. 3, May 1, 2016 (May 1, 2016), p. 155-162, XP055888993, DOI: 10.1109/JEDS.2016.2539980.
Liang Dong et al: "Fabrication and characterization of integrated uncooled infrared sensor arrays using a—Si thin-film transistors as active elements", Journal of Microelectromechanical Systems . , vol. 14, No. 5, Oct. 1, 2005 (Oct. 1, 2005), p. 1167-1177, XP055542153, US.

* cited by examiner

METHOD OF COLLECTING SIGNALS SENSED FROM SENSING TRANSISTORS, CORRESPONDING SENSOR DEVICE AND IMAGING CAMERA

PRIORITY CLAIM

This application claims the priority benefit of Italian Application for Patent No. 102021000013181, filed on May 20, 2021, the content of which is hereby incorporated by reference in its entirety to the maximum extent allowable by law.

TECHNICAL FIELD

The description relates to methods for collecting signals from sensors.

One or more embodiments may be used in connection with passive infrared (IR) temperature sensors, such as thermal MOS (TMOS) transistor devices, for instance.

One or more embodiments may be applied to healthcare or Internet of Things (IoT) contexts.

BACKGROUND

Non-Imaging passive infrared (IR) security sensors are used for health care and industrial applications such as motion detection in alarm systems, for instance.

These sensors are arranged in arrays configured to create an image of an object based on detected infrared radiation emitted therefrom. The created image represents the temperature of the object. It is composed of several sub-pixels corresponding to individual sensors in the array arrangement, which are electrically connected but are thermally isolated.

TMOS devices can be used as IR sensors. The term "TMOS" (or "Thermal MOS") currently refers to a MOS transistor, for instance manufactured in standard CMOS-SOI technology. Thanks to an appropriate micro-processing and dry-etching process, the TMOS comprises a "mass" of silicon. A surface of a connection section between the silicon "mass" and the rest of the semiconductor die is reduced as much as possible (within mechanical tolerances) in order to maximize thermal insulation of the TMOS.

For example, in order to measure IR emissions, the TMOS sensor is configured to transmit the IR radiation to this "mass" part, which becomes heated as a result. The high thermal insulation with the rest of the die ensures that the amount of heat that the TMOS receives from the external quantity to be measured (e.g., IR radiation) causes an appreciable temperature variation.

The temperature variations of the TMOS are converted into electrical signals thanks to the I-V characteristic of the transistor itself. To this end, providing a proper biasing for the TMOS may be of relevance. Moreover, amplification and post-processing of a small current signal produced in response to the temperature variation may play a significant role.

Existing front-end analog signal reading circuits for TMOS sensors envisage a "bridge-like" differential circuit, which measures the electrical signal difference between the optically exposed array of TMOS sensors ("active") and at least one TMOS sensor shielded from optical exposure ("blind").

A solution of this kind is presented by Liang Dong, et al., "Fabrication and characterization of integrated uncooled infrared sensor arrays using a-Si thin-film transistors as active elements," Journal of Microelectromechanical Systems, vol. 14, no. 5, pp. 1167-1177, October 2005, doi: 10.1109/JMEMS.2005.851807 (incorporated by reference). This document discusses a monolithic uncooled 8/spl times/8 infrared sensor arrays, based on amorphous silicon thin-film transistors (a-Si TFT). The a-Si TFT is employed as the active element of the sensor, because it possesses a high temperature coefficient of its drain current at room temperature. The porous silicon micromachining techniques described in the document enable the integration of the a-Si TFT-based sensor array with the MOS readout circuitry. The sacrificial material of porous silicon is prepared in the first step. It is then well protected all the time during the fabrication of MOSFETs and sensors before being released. Optical tests are performed to characterize the sensor. The influences of the gate voltage of a-Si TFT (V/sub g/) and the voltage source of the circuitry (V/sub dd/) on the sensor performance are investigated.

Existing solutions may suffer from one or more of the following drawbacks: difficulty in selecting each pixel for an "active" TMOS sensor and a "blind" TMOS sensor; difficulty in correctly biasing non-selected pixels; complex solutions for reducing TMOS sensor self-heating, introducing additional selection circuits; complex multiplexing operations used to individually address each sensor of the array; and leakage at high temperature may hardly be neglected.

There is a need in the art to contribute in overcoming the aforementioned drawbacks.

SUMMARY

One or more embodiments may relate to a method. A method of collecting signals sensed from sensing transistors in an array of sensing transistors may be exemplary of such a method.

One or more embodiments may relate to a corresponding sensor device.

One or more embodiments may be equipped onboard an IR camera.

One or more embodiments facilitate reading the signal produced by a TMOS array configured to produce and image that represents the distribution in space of the temperature of a radiant object in response to detecting IR radiation incident thereon.

One or more embodiments facilitate reading TMOS signals in an array (e.g., sized n×j) of TMOS devices in a quick way by reducing a thermal constant τ of TMOS devices.

One or more embodiments facilitate maintaining proper biasing for all devices of the array.

One or more embodiments facilitate reducing dead-time due to the thermal transient phenomena of the sensors.

One or more embodiments facilitate reducing temperature leakage effects, in particular at high temperatures.

BRIEF DESCRIPTION OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The drawings are in simplified form and are not to precise scale.

Throughout the figures annexed herein, like parts or elements are indicated with like references/numerals and a corresponding description will not be repeated for brevity.

The references used herein are provided merely for convenience and hence do not define the extent of protection or the scope of the embodiments.

Figure 1:
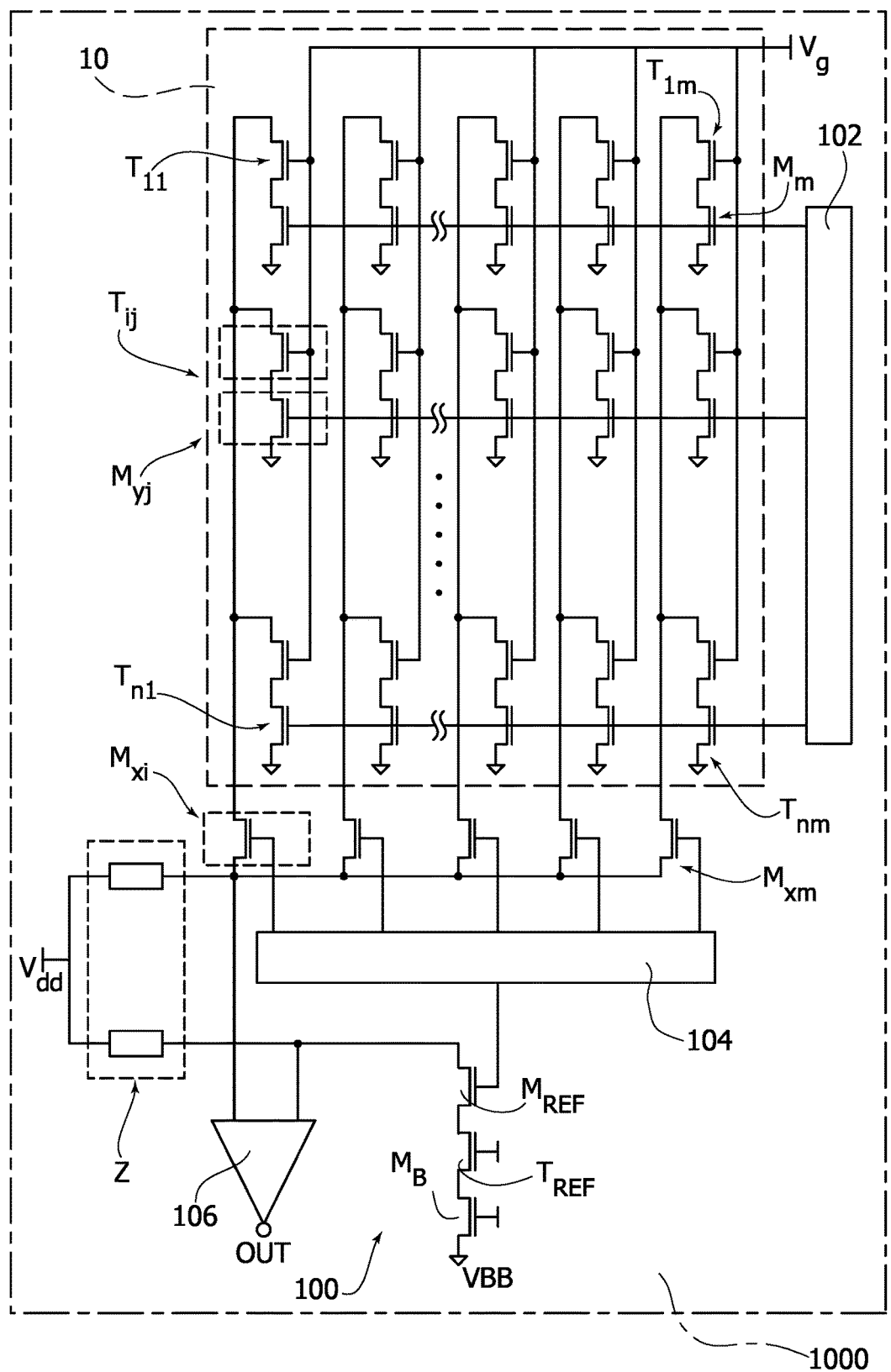
FIG. 1 is a circuit diagram exemplary of an array of sensing transistors.

FIG. 1 is a circuit diagram of a thermal detector array, comprising a sensing circuit portion 10 and a signal processing circuit portion 100.

For the sake of simplicity, one or more embodiments discuss detector arrays including TMOS devices configured to detect infra-red (IR) radiation to provide a signal indicative of a temperature of an object, being otherwise understood that such a kind of sensor devices is purely exemplary and in no way limiting. One or more embodiments may use notionally any kind of sensor, for detecting not only temperature but also other physical quantities, such as pressure, for instance.

As exemplified in FIG. 1, the sensing circuit portion 10 comprises a bidimensional matrix arrangement 10 of a plurality of IR sensors (e.g., TMOS devices) $T_{11}$, $T_{1m}$, . . . , $T_{ij}$, . . . , $T_{n1}$, $T_{nm}$, the matrix arrangement 10 having a number of n rows and m columns, the position of an ij-th IR sensor $T_{ij}$ in the matrix arrangement 10 being identified via a tuple of indexes comprising a first (e.g., row) index i and a second (e.g., column) index j.

For instance, IR sensors $T_{11}$, $T_{1m}$, . . . , $T_{ij}$, . . . on a same i-th row have a common source terminal configured to be coupled to a first common voltage node (e.g., ground) and a common gate terminal configured to be coupled to a biasing voltage level Vg.

The arrangement of thermal sensors as exemplified in FIG. 1 may be used in an IR camera 1000 to produce an image of an object emitting IR radiation by considering the ij-th IR sensor $T_{ij}$ as a pixel of the IR camera 1000. Specifically, a series of bidimensional images may be produced based on thermal IR detectors $T_{11}$, $T_{1m}$, . . . , $T_{ij}$, $T_{n1}$, $T_n$, arranged two-dimensionally as pixels of the images to detect.

As exemplified in FIG. 1, the sensing circuitry 10 further comprises: a biasing branch $V_g$ configured to provide proper biasing voltage level Vg at the control nodes (e.g., gates) of IR sensors of the array $T_{11}$, $T_{1m}$, . . . , $T_{ij}$, . . . , $T_{n1}$, $T_{nm}$; and a plurality of switches comprising a first plurality of (e.g., horizontal) switches and a second plurality of (e.g., vertical) switches, wherein a j-th switch $M_{yj}$ in the first plurality of switches and a i-th switch $M_{xi}$ in the second plurality of switches is coupled to an ij-th IR sensor $T_{ij}$ in the array of sensors 10.

As exemplified in FIG. 1, the signal processing circuit portion 100 of the detector comprises a multiplexing arrangement 102, 104 including a pair of shift registers 102, 104. For instance: a first (e.g., vertical) shift register 102 in the pair of shift registers 102, 104 is coupled to the first plurality of switches $M_{yj}$, the first shift register 102 configured to select the j-th item (e.g., row) of the matrix 10 by activating a j-th switch $M_{yj}$; and the second (e.g., horizontal) shift register 104 is coupled to the second plurality of switches, the second shift register 104 configured to select the i-th entry (e.g., column) of the matrix arrangement 10 by activating an i-th horizontal switch $M_{xi}$.

As exemplified in FIG. 1, the processing circuitry 100 further comprises a reference (e.g., MOSFET) transistor $M_{REF}$ coupled to at least one shift register (e.g., 104) and to a preamplifier stage 106, and a pair of identical resistive loads Z coupled to the preamplifier stage 106 and to the array 10.

In a conventional IR detector as exemplified in FIG. 1, output signals from pixels $T_{ij}$ are (e.g., sequentially) read to and output to a common read amplifier 106.

For instance, the processing circuitry 100 is configured to select (via switches $M_{xi}$, $M_{yj}$) an ij-th IR sensor $T_{ij}$ and to couple reference MOS $M_{REF}$ and the load Z thereto, forming a Wheatstone-like bridge as a result, the bridge configured to convert drain currents in the ij-th sensor $T_{ij}$, in a manner per se known.

As exemplified in FIG. 1, when an ij-th sensor $T_{ij}$ is selected and coupled to the bias branch Vg, all remaining non-selected sensors $T_{11}$, $T_{1m}$, . . . , $T_{n1}$, $T_{nm}$ remain turned off.

For instance, a (drain) current flowing in the selected sensor $T_{ij}$ may be received and amplified via the preamplifier stage 106, e.g., an operational amplifier.

As exemplified in FIG. 1, a serial readout with a single preamplifier 106 provides a relatively simple implementation.

Figure 2:
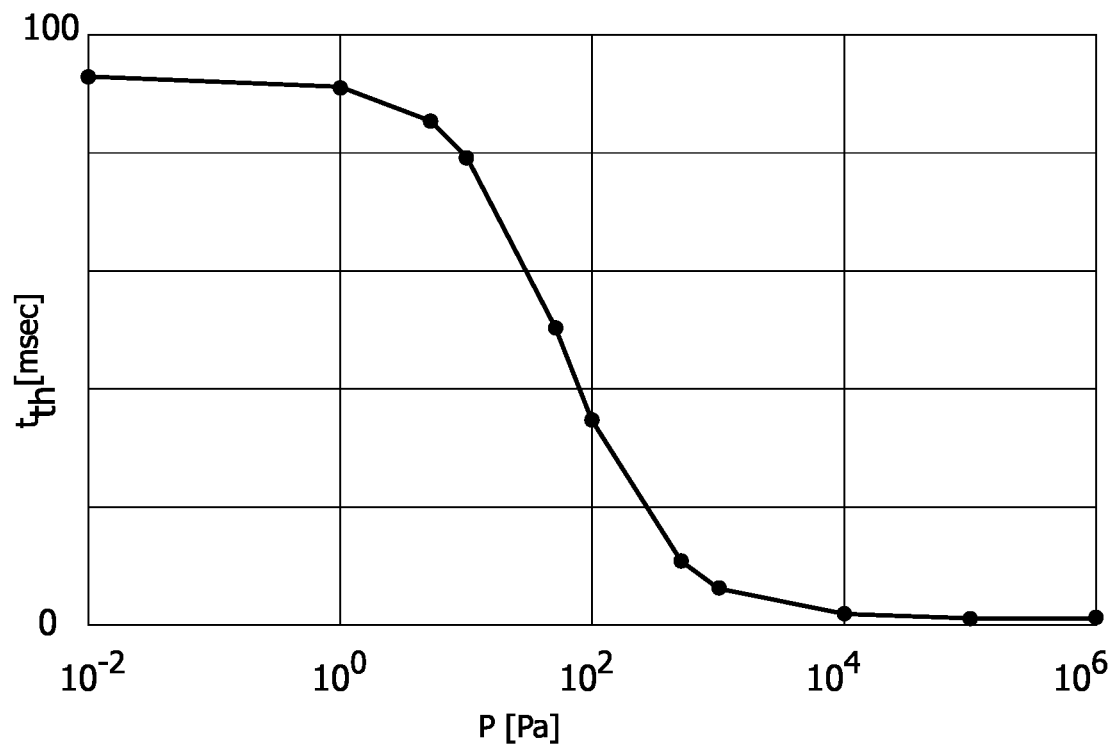
FIGS. 2 and 3 are diagrams exemplary of properties of sensing transistors.

Sensing performance of a TMOS sensor $T_{ij}$ varies based on different parameters, among which an important role can be played by: thermal parameter τ, which is inversely proportional to a (residual) pressure inside the TMOS device (e.g., about 0.01-1 Pascal pressure, corresponding to a thermal parameter about 80-100 milliseconds), as exemplified in FIG. 2; and gate-source voltage $V_{GS}$ evolution over time, in particular a transient interval over time Δt, which is the time interval Δt in which the signal $V_{GS}$ varies from an initial value $V_0$ to a steady state value $V_\infty$.

Figure 3:
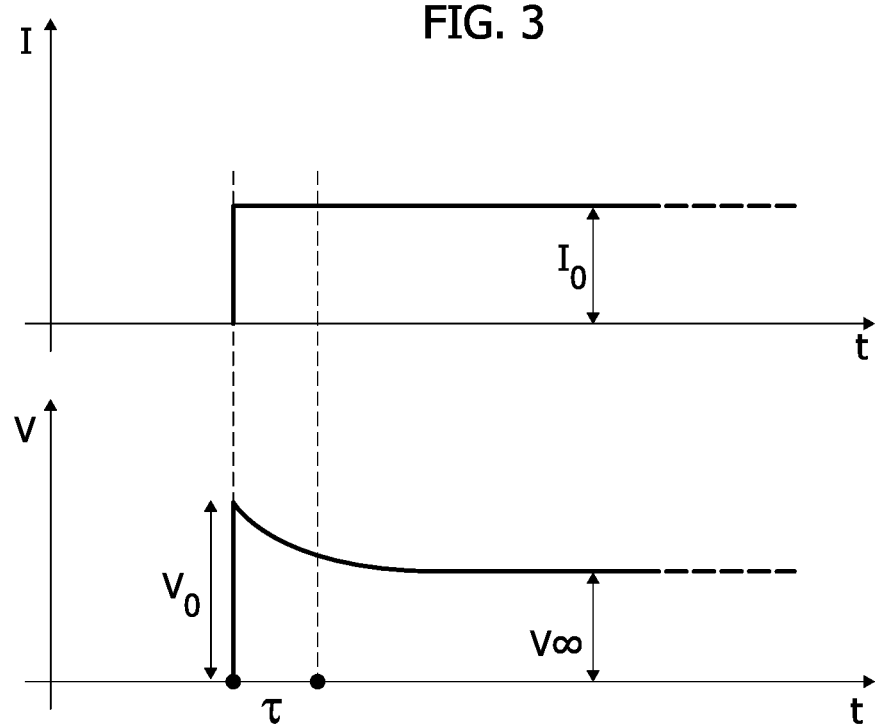

As exemplified in FIG. 3, in an exemplary case where the TMOS $T_{ij}$ is biased using a current $I_0$ provided at an initial time $t_0$, the gate-source voltage signal $V_{GS}$ evolves from an initial value $V_0$, reaching a steady state value $V_\infty$ after the time interval Δt which may be expressed as a multiple of the thermal parameter τ, e.g., Δt≈4τ.

Thermal τ and time Δt parameters can be relevant as it is desirable not to perform thermal sensing during the transient time Δt (which is based on τ) of the TMOS $T_{ij}$. This reduces a possibility of obtaining a temperature measurement influenced by the thermal contribution of power dissipated in the TMOS $T_{ij}$ due to the transient voltage variation from initial value $V_0$ to steady state value $V_\infty$.

Figure 4:
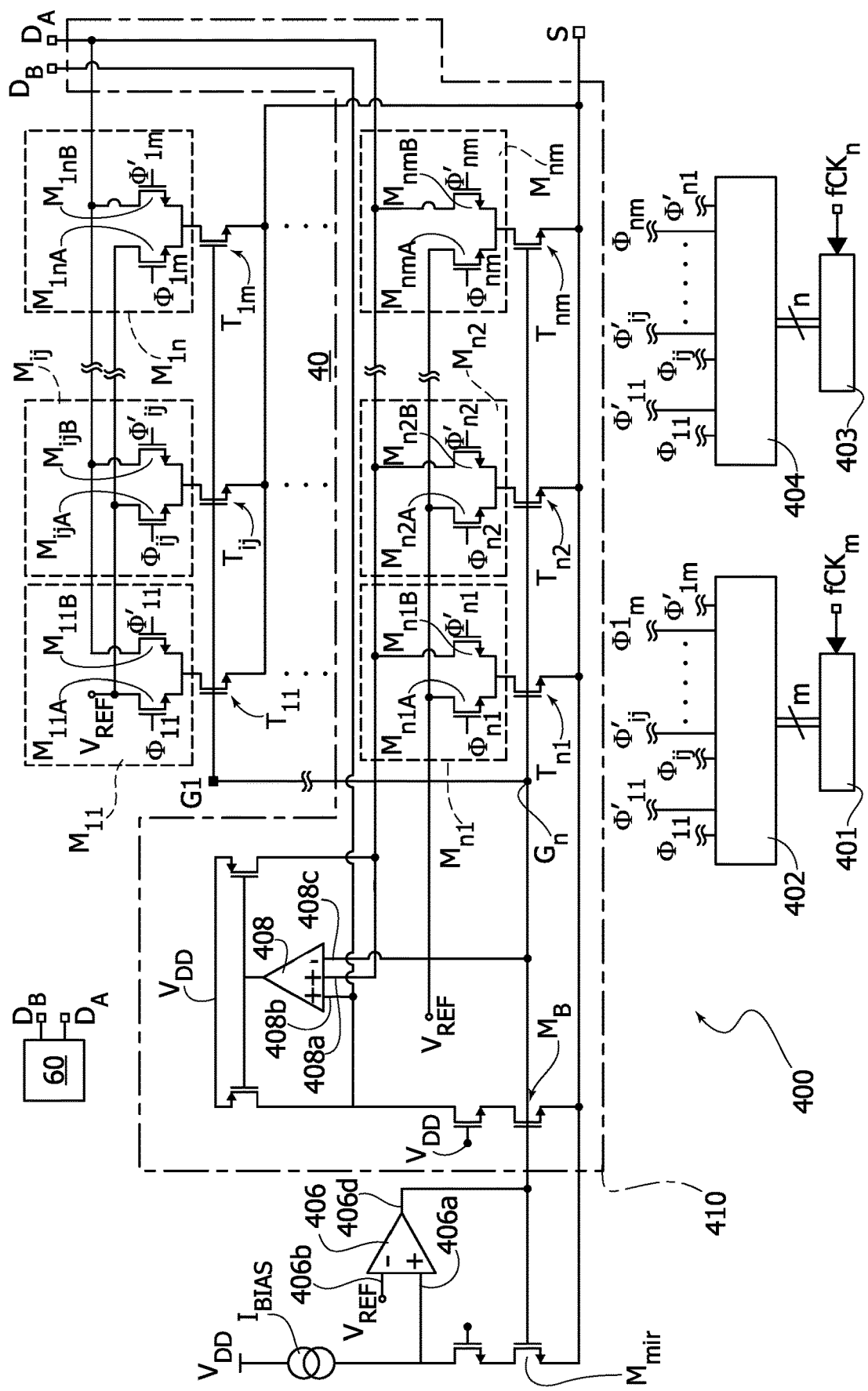
FIGS. 4 and 5 are diagrams exemplary of embodiments as per the present disclosure.
Figure 5:
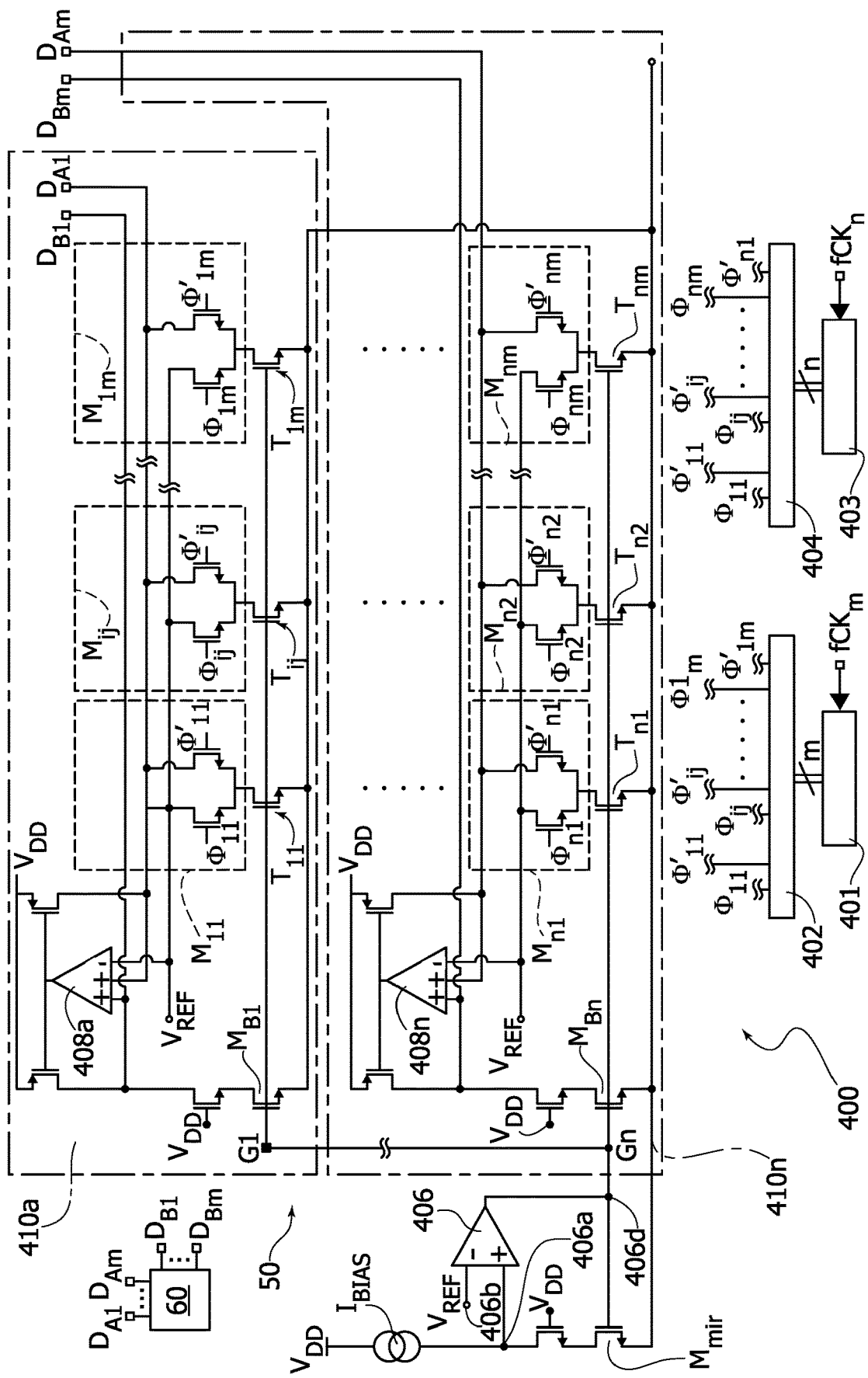

In one or more embodiments as exemplified in FIGS. 4 and 5, the dependence of the sensing performance from the thermal parameter τ may be reduced.

As exemplified in FIG. 4, an IR detector array 40, 400 as per the present disclosure comprises a sensing circuit portion 40 and a signal processing circuit portion 400.

As exemplified in FIG. 4, the sensing circuit portion 40 of the IR detector array comprises a first "active" plurality of TMOS sensors $T_{11}$, $T_{ij}$, $T_{1n}$, $T_{n1}$, $T_{n2}$, $T_{nm}$ arranged in a matrix of n rows and m columns, with an ij-th TMOS sensor $T_{ij}$ identified by a tuple of indices as discussed in the foregoing with respect to the array 10 of FIG. 1; the TMOS sensors $T_{11}$, ..., $T_{1n}$ of a i-th row have a common gate terminal, e.g., $G_1$ for all sensors $T_{11}$, ..., $T_{1n}$ of a first row, and a common source terminal S. The sensing circuit portion 40 further comprises a biasing node $D_B$ configured to couple the "blind" sensor $M_B$ to a biasing branch VDD configured to provide a biasing voltage, for instance via a current mirror $M_{mir}$, $M_B$, coupled to a first operational amplifier 406 configured to set a value of drain-source voltage of the (e.g., MOSFET) transistors of the current mirror arrangement $M_{mir}$, $M_B$ to a reference voltage $V_{REF}$. The sensing circuit portion 40 also comprises an array of selective elements $M_{11}$, $M_{ij}$, $M_{1n}$, $M_{n1}$, $M_{n2}$, $M_{nm}$ comprising selective elements arranged in the same matrix arrangement of the array of sensors 40, an ij-th array of selective elements identified by a tuple of indexes, each coupled to a sensor $T_{ij}$ in the array of sensors 40 having a matching tuple of index values, e.g., selective arrangement $M_{11}$ coupled to sensor $T_{11}$.

As exemplified herein, a sensor device comprises an array of sensing transistors (for instance, $T_{11}$, $T_{ij}$, $T_{1n}$, $T_{n1}$, $T_{n2}$, $T_{nm}$) configured to provide respective current signals indicative of sensed physical quantities, wherein the sensing transistors in the array of sensing transistors have respective control nodes (for instance, $G_1$, ..., $G_n$) and current channel paths therethrough between respective first nodes and a second node (S) common to the sensing transistors in the array. The sensor device further includes signal processing circuitry coupled to the array of sensing transistors and configured to collect signals from sensing transistors in the array of sensing transistors (for instance, $T_{11}$, $T_{ij}$, $T_{1n}$, $T_{n1}$, $T_{n2}$, $T_{nm}$) according to a method as per the present disclosure.

For instance, sensing transistors in the array of sensing transistors comprise TMOS transistors configured to detect infra-red light.

As exemplified herein, an imaging camera (for instance, 1000) is equipped with the sensor device as per the present disclosure.

As exemplified in FIG. 4, an ij-th selective arrangement $M_{ij}$ in the selective arrangement of the array of sensors 40 comprises a pair of switches $M_{ijA}$, $M_{ijB}$ configured to operate as a differential pair and having respective control terminals configured to receive driving signals from the signal processing circuit portion 400 of the detector.

As exemplified in FIG. 4, the signal processing circuit portion 400 comprises a first multiplexing arrangement 402 comprising a m-bit binary counter 401 and a first decoder 402, the m-bit binary counter 401 configured to receive a first clock signal $f_{CKm}$ and to provide a m-bit signal to the first shift register 402, the m-bit decoder 402 configured to produce a set of $2^m$ control signals $\phi_{11}$, $\phi'_{11}$, $\phi_{ij}$, $\phi'_{ij}$, $\phi_{1m}$, $\phi'_{1m}$, the set of $2^m$ control signals comprising a first group of $2^{m-1}$ signals $\phi_{11}$, $\phi_{ij}$, $\phi_{1m}$ configured to drive the control terminal of a first transistor (e.g., those labeled with suffix A in FIG. 4) of the pair of transistors in each selective arrangement (e.g., $M_{11A}$ in selective arrangement $M_{11}$) and a second group of $2^{m-1}$ signals $\phi'_{11}$, $\phi'_{ij}$, $\phi'_{1n}$ configured to drive the control terminal of a second transistor (e.g., labeled with suffix B in FIG. 4) of the pair of transistors in each selective arrangement (e.g., $M_{11B}$ in selective arrangement $M_{11}$), the second group of signals $\phi'_{11}$, $\phi'_{ij}$, $\phi'_{1n}$ produced as a negation (e.g., as an opposite replica) of the signals in the first group of signals, e.g. $\phi'_{11}$=not($\phi_{11}$); these signals are used to selectively activate/deactivate an ij-th sensor $T_{ij}$ in the array of sensors 40, as discussed in the following. The signal processing circuit portion 400 further comprises a second multiplexing arrangement 403, 404 comprising a n-bit binary counter 403 and a second decoder 404, the n-bit binary counter 403 configured to receive a second clock signal $f_{CKn}$ and to provide a n-bit signal to the second shift register 404, the n-bit decoder 402 configured to produce a set of $2^n$ control signals $\phi_{11}$, $\phi'_{11}$, $\phi_{ij}$, $\phi'_{ij}$, $\phi_{n1}$, $\phi'_{n1}$, the set of $2^n$ control signals comprising a first group of $2^{n-1}$ signals $\phi_{11}$, $\phi_{ij}$, $\phi_{1n}$ configured to drive the control terminal of a first transistor (e.g., labeled with suffix A in FIG. 4) of the pair of transistors in each selective arrangement (e.g., $M_{11A}$ in selective arrangement $M_{11}$) and a second group of $2^{n-1}$ signals $\phi'_{11}$, $\phi'_{ij}$, $\phi'_{1n}$ configured to drive the control terminal of a second transistor (e.g., labeled with suffice B in FIG. 4) of the pair of transistors in each selective arrangement (e.g., $M_{11B}$ in selective arrangement $M_{11}$), the second group of signals produced as a negation (e.g., as an opposite replica) of the signals in the first group of signals, e.g. $\phi'_{11}$=not($\phi_{11}$); these signals are used to selectively activate/deactivate an ij-th sensor $T_{ij}$ of the array of sensors 40, as discussed in the following.

As exemplified in FIG. 4, a single active IR sensor $T_{ij}$ can be selected using the first and second decoder stages 401, 402, 403, 404, as discussed in the following.

As exemplified in FIG. 4, the IR detector 40, 400 further comprises an "active" pin $D_A$ and a "blind" pin $D_B$ configured to provide signals from a selected, "active" sensor $T_{ij}$ and from the blind element $M_B$, respectively, for instance couplable to an amplification chain 50 to read output signals therefrom and to produce IR images based on read/sensed signals. The IR detector 40, 400 further comprises a first amplifier stage 406, e.g., operational transconductance amplifier (OTA) having a non-inverting input node 406a, an inverting input node 406b coupled to a reference voltage level $V_{REF}$ and an output node 406d, and a second amplifier stage 408, for instance an OTA having a first non-inverting input node 408a, a second non-inverting input node 408b, an inverting input node 406c coupled to the reference voltage level $V_{REF}$ and an output node 408d. A second biasing node VDD is configured to be coupled to said first and second amplifier stages 406, 408. Transistors $M_{mir}$, $M_B$ are in a current mirror arrangement, the transistors $M_{mir}$, $M_B$ having a common gate terminal coupled to the output node 406d of the first operational amplifier 406 and having a drain-source current path and being coupled to the second non-inverting input node 408b of the second amplifier stage 408. A bias current generator $I_{BIAS}$ is coupled to the current mirror arrangement $M_{mir}$, $M_B$ and configured to provide biasing to an ij-th thermal sensor $T_{ij}$ selectively forming a current mirror therewith, as discussed in the following.

For instance: the first amplifier stage 406 is configured to set a drain-source voltage $V_{DS}$ of the transistors in the current mirror arrangement; the blind pin $D_B$ is coupled to a drain terminal of transistor $M_B$ in the current mirror arrangement $M_{mir}$, $M_B$ and to the second non-inverting node 408b of the second amplifier stage 408; the active pin $D_A$ is configured to be selectively coupled to a target ij-th sensor of the array $T_{ij}$; and the second amplifier stage 408 is configured to set a value of drain-source voltage $V_{DS}$ of the transistors $M_{mir}$, $M_B$ in the current mirror arrangement to a reference voltage $V_{REF}$.

As exemplified in FIG. 4, row-wise common gate nodes $G_1, \ldots, G_n$ are coupled to a common node, for instance a gate terminal of the transistors in the current mirror arrangement $M_{mir}$, $M_B$. As a result, all sensors $T_{11}, \ldots, T_{ij}, \ldots, T_{nm}$ in the sensing circuit portion 40 can be biased via the biasing current $I_{BIAS}$ "reflected" via mirror arrangement $M_{mir}$, $M_B$.

As exemplified in FIG. 4, a method of reading a value of a target ij-th sensor (e.g., $T_{11}$) in the plurality of IR sensors $T_{11}, \ldots, T_{ij}, \ldots, T_{nm}$ in the sensing circuit portion 40 comprises:
  setting a first control signal (e.g., $\phi_{11}$) for the target ij-th sensor (e.g., $T_{11}$) to a first value, e.g., "0";
  obtaining a second control signal (e.g., $\phi'_{11}$) for the target ij-th sensor (e.g., $T_{11}$) having a second value opposite said first value, e.g., "1";
  in response to the second value of the second control signal (e.g., $\phi'_{11}=1$) for the target ij-th sensor (e.g., $\phi'_{11}$), coupling a first (e.g., drain) terminal of the target ij-th sensor (e.g., $T_{11}$) to the second OTA 408, in particular to the first non-inverting input 408a thereof;
  as a result, setting drain-source voltage of the blind transistor $M_B$ in the current mirror arrangement $M_{mir}$, $M_B$ and of the selected target ij-th sensor (e.g., $T_{11}$) at the reference voltage $V_{REF}$, for instance exploiting the high gain of the OTA 408; and
  repeating sequentially the operations above for any ij-th sensor $T_{ij}$ in the array of sensors.

It is noted that, when an ij-th control signal (e.g., $\phi_{11}$) is set to the first value (e.g., $\phi_{11}=0$) in order to select the target ij-th IR sensor (e.g., $T_{11}$), all other control signals are at the second value (e.g., "1" or VDD.)

As exemplified in FIG. 4, leakage currents from selective arrangements $M_{11}, \ldots, M_{1n}$ are reduced, for instance to a value equal to a product of biasing current $I_{BIAS}$ and on-resistance $R_{on}$ of the (selected) selective arrangements (e.g., $M_{11A}$ in the example above).

As exemplified in FIG. 4, a circuit block 410 comprises the second amplifier stage 408, the blind transistor $M_B$, the respective blind $D_B$ and active pins $D_A$ and a j-th row of sensors $T_{n1}, \ldots, T_{nm}$ (and respective selective arrangements $M_{n1}, \ldots, M_{nm}$) of the sensor array 40.

As exemplified in FIG. 5, circuit block 410 may be replicated, with a replica 410a, ..., 410n for each item (e.g., row) in an alternative embodiment 50 configured to perform reading of multiple sensors $T_{11}, \ldots, T_{ij}, \ldots, T_{nm}$ in parallel. For instance, this facilitates increasing a speed of processing signals in the signal processing portion 400.

A method as exemplified herein, comprises: collecting current signals from sensing transistors in an array of sensing transistors (for instance, $T_{11}, T_{ij}, T_{1n}, T_{n1}, T_{n2}, T_{nm}$) configured to provide respective current signals indicative of sensed physical quantities, wherein the sensing transistors in the array of sensing transistors have respective control nodes (for instance, $G_1, \ldots, G_n$) and current channel paths therethrough between respective first nodes and a second node (for instance, S) common to the sensing transistors in the array.

For instance, the method comprises:
  applying a bias voltage level (for instance, $V_{REF}$) to said respective first nodes of the sensing transistors in the array;
  selecting (for instance, $M_{ij}$) a sensing transistor (for instance, $T_{ij}$) in the array of sensing transistors;
  decoupling (for instance, $\phi_{ij}$) the selected sensing transistor from the bias voltage level while maintaining coupled (for instance, $\phi_{11}, \phi_{ij}, \phi_{1m}, \phi_{n1}, \phi_{n1}$) to the bias voltage level ($V_{REF}$) the sensing transistors in the array of sensing transistors other than the sensing transistor selected (for instance, $T_{ij}$); and
  coupling (for instance, $\phi'_{ij}$) to an output node (for instance, $D_A$) the respective first node of the sensing transistor selected in the array of sensing transistors and collecting an output current signal from said output.

As exemplified herein, the method further comprises sequentially selecting a different sensing transistor (for instance, $T_{ij}$) in the array of sensing transistors, sequentially collecting current signals provided from said different sensing transistors selected.

As exemplified herein, the method further comprises providing a plurality of arrangements of matching transistors (for instance, $M_{11}, M_{ij}, M_{1n}, M_{n1}, M_{n2}, M_{nm}$) in the array of sensing transistors, the arrangements of matching transistors in the array of sensing transistors configured to selectively couple respective first nodes of sensing transistors to a biasing voltage source (for instance, $V_{REF}$) or to the output node, alternatively, based on a plurality of control signals (for instance, $\phi_{11}, \phi_{1m}, \phi_{n1}, \phi_{n1}$).

Decoupling (for instance, $\phi_{ij}$) the selected sensing transistor (for instance, $T_{ij}$) from the bias voltage level (for instance, $V_{REF}$) while maintaining coupled (for instance, $\phi_{11}, \phi_{ij}, \phi_{1m}, \phi_{n1}, \phi_{n1}$) to the bias voltage level the sensing transistors in the array of sensing transistors other than the sensing transistor selected comprises setting a selected control signal (for instance, $\phi_{ij}$) of a respective selective (transistor) arrangement (for instance, $M_{ij}$) matching the selected sensing transistor (for instance, $T_{ij}$) to a first value and setting control signals in the plurality of control signals (for instance, $\phi_{11}, \phi_{1m}, \phi_{n1}, \phi_{n1}$) other than the selected control signal ($\phi_{ij}$) to a second value opposite said first value.

For instance, the method comprises:
  providing at least one clock signal (e.g., $f_{CKn}, f_{CKm}$);
  producing (for instance, 401, 403) a binary signal indicative of a number of cycles of the at least one clock signal; and
  producing (for instance, 402, 404) the control signals based on the binary signal indicative of a number of cycles of the at least one clock signal.

As exemplified herein, the method comprises:
  providing at least one reference sensing transistor (for instance, $M_B$) configured to provide a blind reference current; and
  coupling the selected sensing transistor (for instance, $T_{ij}$) in the array of sensing transistors to the at least one reference sensing transistor, subtracting said blind reference current from the respective current signal, producing a respective normalized current signal as a result, and coupling the selected sensing transistor (for instance, $T_{ij}$) in the array of sensing transistors to the output node (for instance, $D_A$), collecting the respective normalized current signal therefrom.

One or more embodiments as exemplified in FIG. 5 exploit to the possibility to select concurrently a group of sensors $T_{11}, \ldots, T_{1m}$ belonging to an item or entry (e.g., row) of the sensing circuit portion of the array 50, reducing a time for converting drain-source current values to pixel values.

As exemplified in FIG. 5, an array 50 comprises replicas 410a, ..., 410n of circuit block 410 as exemplified in FIG. 4 repeated at each row of sensors (e.g., $T_{11}, \ldots, T_{1n}$).

As exemplified in FIG. 5, each row of the array of sensors 50 comprises a respective blind sensor $M_{B1}, \ldots, M_{Bj}$ and an operational amplifier 408a, ..., 408n.

For instance, array 50 comprises: a plurality of blind pixels $M_{Bj}$ for each j-th row of the array 50; a plurality of second amplifier stages 408a, ..., 408n, one for each j-th row of the array 50; a plurality of active pins $D_{A1}$, ..., $D_{An}$, and a plurality of blind pins $D_{B1}$, ..., $D_{Bn}$; and a plurality of selective arrangements $M_{j1}$, $M_{jn}$n coupled to the respective IR sensor $T_{j1}$, ..., $T_{jn}$ of the array 50, to the amplifier stages 408a, ..., 408n and to the respective active pin $D_{Aj}$ and blind pin $D_{Aj}$.

For instance, selecting a j-th row of sensors of the array 5, comprises: setting all control signals to a first, e.g., "0", value, e.g., $\Phi_{11}=\Phi_{21}=...=\Phi_{j1}=0$; as a result, coupling all sensors $T_{n1}, ... T_{nm}$ in a j-th row to the respective j-th second amplifier stage (e.g., 408n) and to the respective active pin $D_{Aj}$, producing a plurality of reading signals to user circuit 60 as a result.

For instance, an active pixel $T_{ij}$ per i-th row can be selected and connected to the output drain of the row $D_{Aj}$, while the remaining non-selected pixels $T_{11}, ..., T_{1n}$ are biased on at same current and $V_{DS}$.

It is noted that while selecting a j-th row, remaining IR sensors in the array 50 remain biased via reference voltage $V_{REF}$ during their inactivity, so that also "blind" (that is, during inactivity) current values may be provided at respective blind pins $D_{B1}, ..., D_{Bj}, ..., D_{Bm}$, for instance at a same time with active currents provided at the active pins $D_{A1}, ..., D_{Aj}, ... D_{An}$.

As exemplified herein, a method comprises providing at least one further output terminal (for instance, $D_B$) configured to collect the blind reference current from the reference sensing transistor (for instance, $M_B$).

As exemplified herein, the array of sensing transistors (for instance, $T_{11}, T_{ij}, T_{1n}, T_{n1}, T_{n2}, T_{nm}$) is a planar array, a position of a sensing transistor in the array of sensing transistors and of the matching selective arrangements (for instance, $M_{ij}$) is identified with a tuple of indices.

For instance, the method comprises:
providing a biasing voltage level (for instance, $V_{REF}$) and coupling thereto said respective first nodes of sensing transistors and the at least one reference transistor (for instance, $M_B$) in the array of sensing transistors;
selecting (for instance, $M_{ij}$) a sensing transistor (for instance, $T_{ij}$) in every row of the array of sensors;
decoupling (for instance, $\phi_{ij}$) the selected sensing transistor in every row from the bias voltage level while maintaining coupled (for instance, $\phi_{11}\phi_{ij}, \phi_{1m}, \phi_{n1}, \phi_{n1}$) to the bias voltage level the sensing transistors in the array of sensing transistors other than the sensing transistor selected; and
coupling each of the selected sensing transistor in every row of the array of sensing transistors to a respective output node in a plurality of output nodes (for instance, $D_{A1}, ..., D_{Am}$) and collecting the respective current signals in parallel therefrom.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection.

The claims are an integral part of the technical teaching provided herein with reference to the embodiments.

The extent of protection is determined by the annexed claims.

The invention claimed is:

1. A method for collecting current signals indicative of sensed physical quantities from sensing transistors in an array of sensing transistors, wherein the sensing transistors in the array of sensing transistors have respective control nodes and current channel paths therethrough between respective first nodes and a second node common to the sensing transistors in the array, the method comprising:
applying a bias voltage level to the first nodes of all of the sensing transistors in the array;
selecting a sensing transistor in the array of sensing transistors;
decoupling the first node of the selected sensing transistor from said bias voltage level while simultaneously maintaining coupling of the first nodes of the sensing transistors in the array of sensing transistors other than the selected sensing transistor to said bias voltage level;
coupling the first node of the selected sensing transistor to an output node; and
collecting an output current signal from said output node.

2. The method of claim 1, wherein selecting comprises sequentially selecting a different sensing transistor in the array of sensing transistors whose first node is decoupled from the bias voltage level, and wherein collecting comprises sequentially collecting current signals provided from each of the sequentially selected sensing transistors.

3. The method of claim 1, wherein a plurality of arrangements of matching transistors in the array of sensing transistors are configured to selectively couple respective first nodes of sensing transistors to a biasing voltage source providing the bias voltage level and to the output node in an alternative manner based on a plurality of control signals, wherein decoupling the selected sensing transistor from said bias voltage level while simultaneously maintaining coupling of the first nodes of the sensing transistors in the array of sensing transistors other than the selected sensing transistor to said bias voltage level comprises:
setting a selected control signal of a respective selective arrangement matching the selected sensing transistor to a first value and setting control signals in the plurality of control signals other than the selected control signal to a second value opposite said first value.

4. The method of claim 3, comprising:
providing at least one clock signal;
producing a binary signal indicative of a number of clock cycles of the at least one clock signal; and
producing the control signals based on said binary signal indicative of the number of clock cycles of the at least one clock signal.

5. The method of claim 1, wherein at least one reference sensing transistor is configured to provide a blind reference current, the method further comprising:
coupling the selected sensing transistor in the array to the at least one reference sensing transistor;
subtracting said blind reference current from a current signal of the selected sensing transistor; and
producing a normalized current signal resulting from the subtraction;
wherein coupling comprises coupling the normalized current signal to the output node for collection as said output current signal.

6. The method of claim 5, further comprising outputting the blind reference current from the reference sensing transistor to at least one further output terminal for collection.

7. The method of claim 1, wherein the array of sensing transistors is a planar array, a position of a sensing transistor in the array of sensing transistors and of the matching selective arrangements being identified with a tuple of indices, and wherein the method further comprises:
providing a biasing voltage level and coupling thereto said respective first nodes of sensing transistors and the at least one reference transistor in the array of sensing transistors;
selecting a sensing transistor in every row of the array of sensors;
decoupling the selected sensing transistor in every row from said bias voltage level while simultaneously maintaining coupled to the bias voltage level the sensing transistors in the array of sensing transistors other than the sensing transistor selected; and
coupling each of the selected sensing transistor in every row of the array of sensing transistors to a respective output node in a plurality of output nodes and collecting the respective current signals in parallel therefrom.

8. A sensor device, comprising:
an array of sensing transistors configured to provide respective current signals indicative of sensed physical quantities, wherein the sensing transistors in the array of sensing transistors have respective control nodes and current channel paths therethrough between respective first nodes and a second node common to the sensing transistors in the array; and
circuitry coupled to the array of sensing transistors and configured to collect signals from sensing transistors in the array of sensing transistors by:
applying a bias voltage level to the first nodes of all of the sensing transistors in the array;
selecting a sensing transistor in the array of sensing transistors;
decoupling the first node of the selected sensing transistor from said bias voltage level while simultaneously maintaining coupling of the first nodes of the sensing transistors in the array of sensing transistors other than the selected sensing transistor to said bias voltage level; and
coupling the first node of the selected sensing transistor to an output node; and
collecting an output current signal from said output node.

9. The sensor device of claim 8, wherein said sensing transistors in the array of sensing transistors comprise thermal MOS (TMOS) transistors configured to detect infra-red light.

10. The sensor device of claim 8, wherein said circuitry is further configured to sequentially select a different sensing transistor in the array of sensing transistors, and sequentially collecting current signals provided from said different selected sensing transistors.

11. The sensor device of claim 8, wherein the plurality of arrangements of matching transistors in the array of sensing transistors are configured to selectively couple respective first nodes of sensing transistors to a biasing voltage source and the output node in an alternative manner based on a plurality of control signals, and wherein the circuitry, in decoupling the selected sensing transistor from said bias voltage level while maintaining coupling to said bias voltage level the sensing transistors in the array of sensing transistors other than the selected sensing transistor, is configured to:
set a selected control signal of a respective selective arrangement matching the selected sensing transistor to a first value and set control signals in the plurality of control signals other than the selected control signal to a second value opposite said first value.

12. The sensor device of claim 11, wherein the circuitry is further configured to:
provide at least one clock signal;
produce a binary signal indicative of a number of clock cycles of the at least one clock signal; and
produce the control signals based on said binary signal indicative of the number of clock cycles of the at least one clock signal.

13. The sensor device of claim 8, further comprising at least one reference sensing transistor configured to provide a blind reference current, and wherein the circuitry is further configured to:
couple the selected sensing transistor in the array to the at least one reference sensing transistor;
subtract said blind reference current from a current signal of the selected sensing transistor; and
produce a normalized current signal as a result of the subtraction;
wherein said coupling comprises coupling the normalized current signal to the output node for collection as said output current signal.

14. The sensor device of claim 13, further comprising at least one further output terminal configured to collect the blind reference current from the reference sensing transistor.

15. The sensor device of claim 8, wherein the array of sensing transistors is a planar array, a position of a sensing transistor in the array of sensing transistors and of the matching selective arrangements being identified with a tuple of indices, and wherein the circuitry is further configured to:
provide a biasing voltage level and coupling thereto said respective first nodes of sensing transistors and the at least one reference transistor in the array of sensing transistors;
select a sensing transistor in every row of the array of sensors;
decouple the selected sensing transistor in every row from said bias voltage level while maintaining coupled to the bias voltage level the sensing transistors in the array of sensing transistors other than the sensing transistor selected; and
couple each of the selected sensing transistor in every row of the array of sensing transistors to a respective output node in a plurality of output nodes and collecting the respective current signals in parallel therefrom.

16. An imaging camera equipped with the sensor device of claim 9.

* * * * *